US012697951B2

(12) United States Patent
McCleish et al.

(10) Patent No.: US 12,697,951 B2
(45) Date of Patent: Aug. 4, 2026

(54) BRAKE SYSTEM FOR AUTONOMOUS OPERATION

(71) Applicant: Deere & Company, Moline, IL (US)

(72) Inventors: Ryan G. McCleish, Cedar Falls, IA (US); Michael A. Holland, Conrad, IA (US); Aaron M. Quinn, Cedar Falls, IL (US); James C. Bartlett, Alden, IA (US)

(73) Assignee: Deere & Company, Moline, IL (US)

( * ) Notice: Subject to any disclaimer, the term of this patent is extended or adjusted under 35 U.S.C. 154(b) by 380 days.

(21) Appl. No.: 18/446,407

(22) Filed: Aug. 8, 2023

(65) Prior Publication Data

US 2024/0092327 A1 Mar. 21, 2024

Related U.S. Application Data

(60) Provisional application No. 63/407,405, filed on Sep. 16, 2022.

(51) Int. Cl.
*B60T 8/94* (2006.01)
*B60T 7/12* (2006.01)
(Continued)

(52) U.S. Cl.
CPC .................................... *B60T 8/94* (2013.01); *B60T 7/12* (2013.01); *B60T 8/885* (2013.01); *B60T 13/148* (2013.01);
(Continued)

(58) Field of Classification Search
CPC ... B60T 8/94; B60T 8/885; B60T 7/12; B60T 13/148; B60T 13/686; B60T 2270/402; B60T 2270/88; B60T 13/662; B62D 49/06
See application file for complete search history.

(56) References Cited

U.S. PATENT DOCUMENTS

| 2,804,753 A | * | 9/1957 | Leduc | ..................... B64C 13/24 |
| | | | | 91/33 |
| 3,142,962 A | * | 8/1964 | Lohbauer | .............. B60T 13/148 |
| | | | | 60/427 |

(Continued)

FOREIGN PATENT DOCUMENTS

| CN | 102588474 A | 7/2012 |
| DE | 102018209336 A1 | 12/2019 |
| DE | 102023108135 A1 | 2/2024 |

OTHER PUBLICATIONS

German Search Report issued in application No. 102023125004.3 dated Jun. 18, 2024, 08 pages.

*Primary Examiner* — Robert A. Siconolfi
*Assistant Examiner* — James K Hsiao
(74) *Attorney, Agent, or Firm* — Tucker Ellis LLP; Patrick F. Clunk

(57) ABSTRACT

One or more techniques and/or systems are disclosed for providing autonomous or semi-autonomous braking with a brake system. The brake system includes at least one brake, a main pump, a backup energy source, a primary valve set having a primary control valve and enable valve, and a secondary valve set having a secondary control valve and an enable valve, wherein the at least one brake, the main pump, the backup energy source, the primary valve set, and the secondary valve set are in fluid communication. The brake system further includes a control unit configured to control operation of the main pump, the backup energy source, the primary valve set, and the secondary valve set in response to one of a normal braking condition and a failure braking condition.

20 Claims, 12 Drawing Sheets

(51) Int. Cl.

| | |
|---|---|
| *B60T 8/88* | (2006.01) |
| *B60T 13/14* | (2006.01) |
| *B60T 13/68* | (2006.01) |
| *B60T 17/22* | (2006.01) |
| *B62D 49/06* | (2006.01) |

(52) U.S. Cl.
CPC ............ *B60T 13/686* (2013.01); *B60T 17/22* (2013.01); *B60T 2270/402* (2013.01); *B60T 2270/88* (2013.01); *B62D 49/06* (2013.01)

(56) References Cited

U.S. PATENT DOCUMENTS

| | | | | |
|---|---|---|---|---|
| 3,708,030 | A | 1/1973 | Ueda et al. | |
| 7,516,563 | B2* | 4/2009 | Koch | E02F 9/2045 |
| | | | | 37/379 |
| 9,827,960 | B2* | 11/2017 | Feigel | B60T 13/686 |
| 10,040,436 | B2 | 8/2018 | Schick et al. | |
| 10,166,956 | B2 | 1/2019 | Schick et al. | |
| 10,173,652 | B2 | 1/2019 | Schick et al. | |
| 10,458,810 | B2* | 10/2019 | Fasola | G01C 21/3407 |
| 10,661,766 | B2 | 5/2020 | Schick et al. | |
| 12,005,881 | B2* | 6/2024 | Miller | B60T 8/885 |
| 2008/0238187 | A1* | 10/2008 | Garnett | F16H 61/4096 |
| | | | | 180/199 |
| 2009/0013810 | A1* | 1/2009 | Nakagawa | F16H 61/0246 |
| | | | | 74/335 |
| 2009/0043462 | A1* | 2/2009 | Stratton | E02F 9/26 |
| | | | | 701/50 |
| 2013/0080017 | A1* | 3/2013 | Bohm | B60T 7/042 |
| | | | | 701/93 |
| 2017/0274884 | A1* | 9/2017 | Besier | B60T 13/686 |
| 2017/0361825 | A1* | 12/2017 | Drumm | B60T 8/4081 |
| 2019/0232937 | A1* | 8/2019 | Georgin | G07C 5/006 |
| 2019/0344767 | A1* | 11/2019 | Bareiss | B60T 7/12 |
| 2020/0361439 | A1* | 11/2020 | Neu | B60T 13/146 |
| 2021/0146902 | A1* | 5/2021 | Digesu' | B60T 7/16 |
| 2021/0221345 | A1* | 7/2021 | Maruo | B60T 7/042 |
| 2022/0332302 | A1 | 10/2022 | Watanabe et al. | |
| 2023/0182702 | A1* | 6/2023 | Ganzel | B60T 13/745 |
| | | | | 303/3 |
| 2023/0256952 | A1* | 8/2023 | Kokrehel | B60T 8/92 |
| | | | | 188/106 P |
| 2024/0052899 | A1 | 2/2024 | Ganzel et al. | |

* cited by examiner

BRAKE SYSTEM FOR AUTONOMOUS OPERATION

CROSS-REFERENCE TO RELATED APPLICATIONS

This non-provisional application claims the benefit of and priority to U.S. Provisional Application No. 63/407,405, filed Sep. 16, 2022, the disclosure of which is hereby incorporated by reference herein in its entirety.

BACKGROUND

Vehicles, such as tractors, are being designed to operate autonomously. While operating autonomously, the braking function is still needed, for example, to control vehicle train speed, slow the vehicle train, bring the vehicle to a complete stop (as needed) in the work cycle, or when an object is detected near the tractor and/or connected implement. Current tractor service and backup brake architectures are designed to be actuated by an operator sitting in the operator station of the tractor (e.g., cab of the tractor). The operator can apply the brakes in the cab using foot or hand forces to actuate a pedal or lever. As such, current brake systems do not provide for autonomous operation to stop the vehicle (e.g., tractor), such as during normal operation or during a brake failure event.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for autonomous braking, such as autonomous braking of a tractor. For example, an autonomous brake system actuates tractor brakes autonomously, and in the event of a single point failure, provides a backup to actuate the brakes.

In one implementation for providing autonomous braking, a brake system includes at least one brake, a main pump, a backup energy source, a primary valve set having a primary control valve and an enable valve, and a secondary valve set having a secondary control valve and an enable valve, wherein the at least one brake, the main pump, the backup energy source, the primary valve set, and the secondary valve set are in fluid communication. The brake system further includes a control unit configured to control operation of the main pump, the backup energy source, the primary valve set, and the secondary valve set in response to one of a normal braking condition or a failure braking condition.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The examples disclosed herein may take physical form in certain parts and arrangement of parts, and will be described in detail in this specification and illustrated in the accompanying drawings which form a part hereof and wherein.

DETAILED DESCRIPTION

Figure 1:
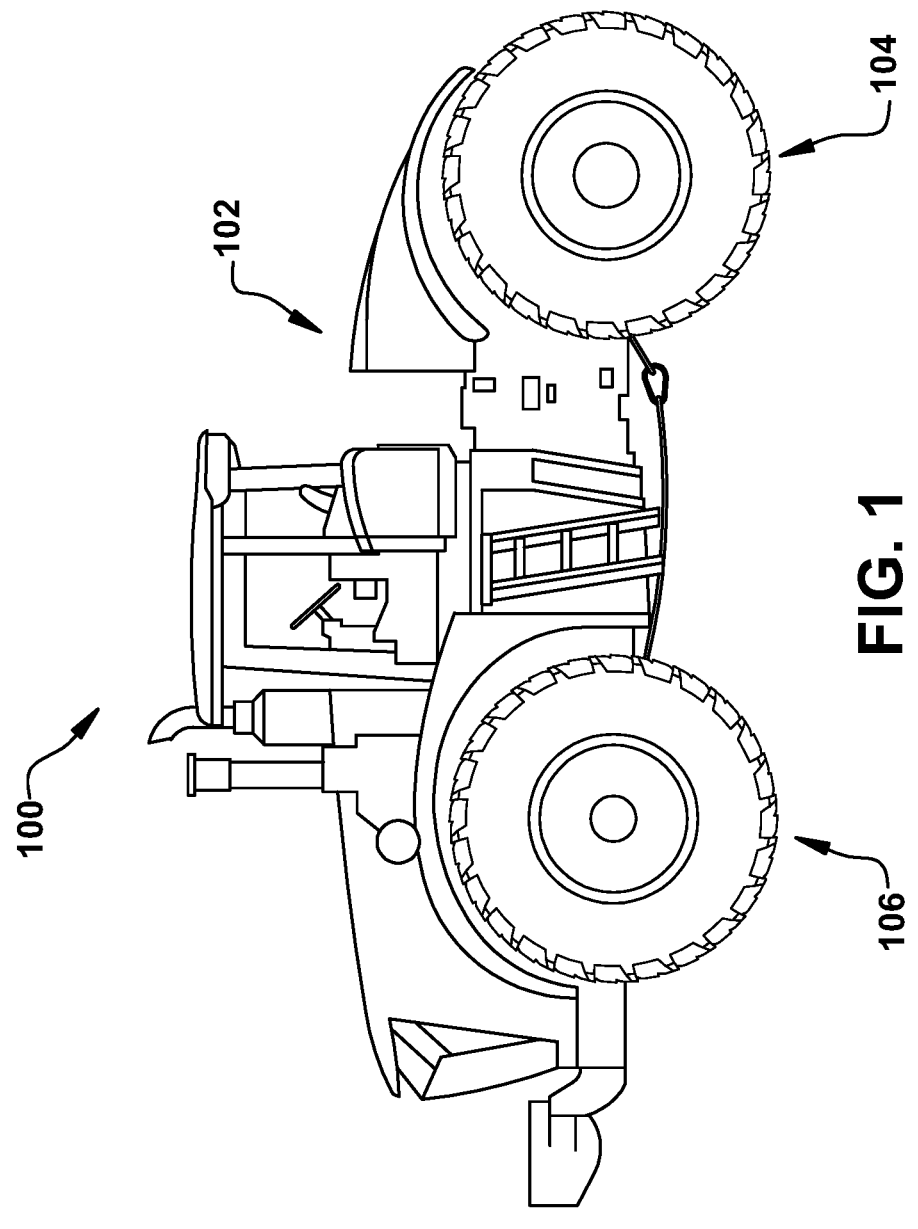
FIG. 1 is a component diagram illustrating an example implementation of a vehicle in which various examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different braking applications, such as for different autonomous and semi-autonomous applications and in different vehicles. That is, the herein disclosed examples can be implemented in combination with different braking systems other than for particular vehicles, such as other than for farm vehicles (e.g., tractors).

FIG. 1 is a component diagram illustrating an example implementation of a system that may utilize one or more portions of the aspects and examples described herein. In the implementation illustrated in FIG. 1, a vehicle 100, such as a tractor, can perform different operations, such as a ground working operation in a field. In some implementations, the vehicle 100 has wheels 104, 106 installed thereon. In other implementations, the vehicle 100 has track systems (not shown) instead of wheels installed on the rear or both the front and rear of the vehicle 100.

The vehicle 100 includes a chassis 102, which provides attachment points for the vehicle 100. For example, a work tool (e.g., a bucket, fork, blade, auger, or hammer) can be connected to the front or back of the chassis 102. The work tool is movably connected to the chassis 102 in some examples.

The vehicle 100 further includes a brake system as described in more detail herein. For example, the brake system is configured to autonomously apply the brakes and slow or stop the vehicle 100, such as to apply brake force(s) to control vehicle train speed, slow the vehicle train, bring the vehicle 100 to a complete stop in the work cycle, or when an object is detected near the tractor and implement.

While various examples are described in connection with a tractor or control arrangement having a particular configuration, the systems and methods described herein may also be utilized with other types of vehicles and implements. For example, the vehicle may comprise another utility-type vehicle, such as a truck, hauler, semi-tractor, or any vehicle that uses a brake system, such as any vehicle with one or more brakes. For example, one or more herein described aspects can be implemented in a work vehicle, such as a backhoe loader, but may be any work vehicle with a brake system, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, among others. The various examples can also be implemented in other work vehicles, passenger vehicles, or other equipment having brakes.

Figure 2:
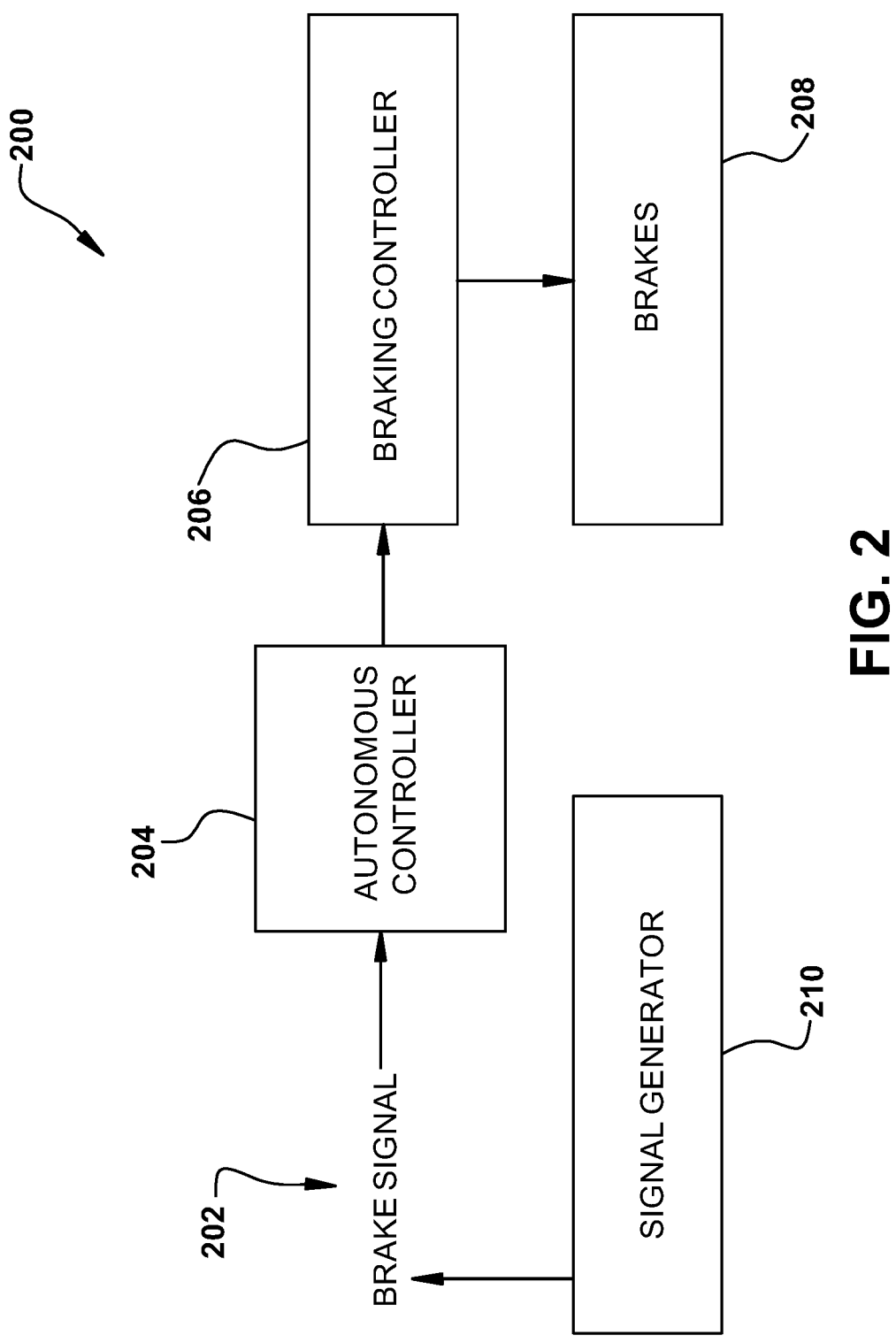
FIG. 2 is a block diagram illustrating an autonomous brake system according to one implementation.

The vehicle 100 in one example is a tractor that includes and/or operates with an autonomous brake system 200 as illustrated in FIG. 2. The autonomous brake system 200 includes an autonomous controller 204 configured to receive a brake signal (e.g., a wireless brake control signal) and transmit the received brake signal to a braking controller 206. In some examples, the autonomous controller 204 processes or pre-processes the received brake signal before transmitting the signal to the autonomous controller 204. In some examples, the autonomous controller 204 is a transmission and reception device (e.g., a transceiver) that operates to communicate between the braking controller 206 and an autonomous signal generator 210 that generates the brake signal 202. The autonomous signal generator 210 can be provided at different locations, such as at an autonomous control console located remote from the vehicle 100 (e.g., in a farm building), in the cab of the vehicle 100, etc. The autonomous signal generator 210 generates signals based on one or more user inputs (e.g., a user input at a control console or user interface) in some examples and automatically generates signals in other examples (e.g., based on feedback, to stop a vehicle when an object is detected, to switch to back-up or auxiliary braking during a detected failure event or condition).

The braking controller 206 in various examples is configured to control operation of one or more brakes 208 as described in more detail herein. That is, the braking controller 206 receives the signals from the autonomous controller 204 and controls operation of one or more components of the brakes 208 (or associated components) to cause a braking force to be applied to slow or stop the vehicle 100. It should be noted that in some examples, the braking controller 206 controls brake operation of the brakes 208 of the vehicle. In some examples, the braking controller 206 controls brake operation of trailer brakes in a trailer or other implement being towed by the vehicle 100. The braking controller 206 can control the brake operation of different brakes associated with different vehicles. It should be noted that one or components or operations of the autonomous brake system 200 can be combined or separated and the functional/operational blocks in FIG. 2 are merely shown for example. For example, while the autonomous controller 204 is shown connected to the braking controller 206 and then to the brakes 208 in series, other configurations and connections are contemplated. For example, the autonomous controller 204 in some arrangements is configured to send a signal directly to the brakes 208. In this way, parallel signals can be output from the autonomous controller 204 as an added redundancy.

Figure 3:
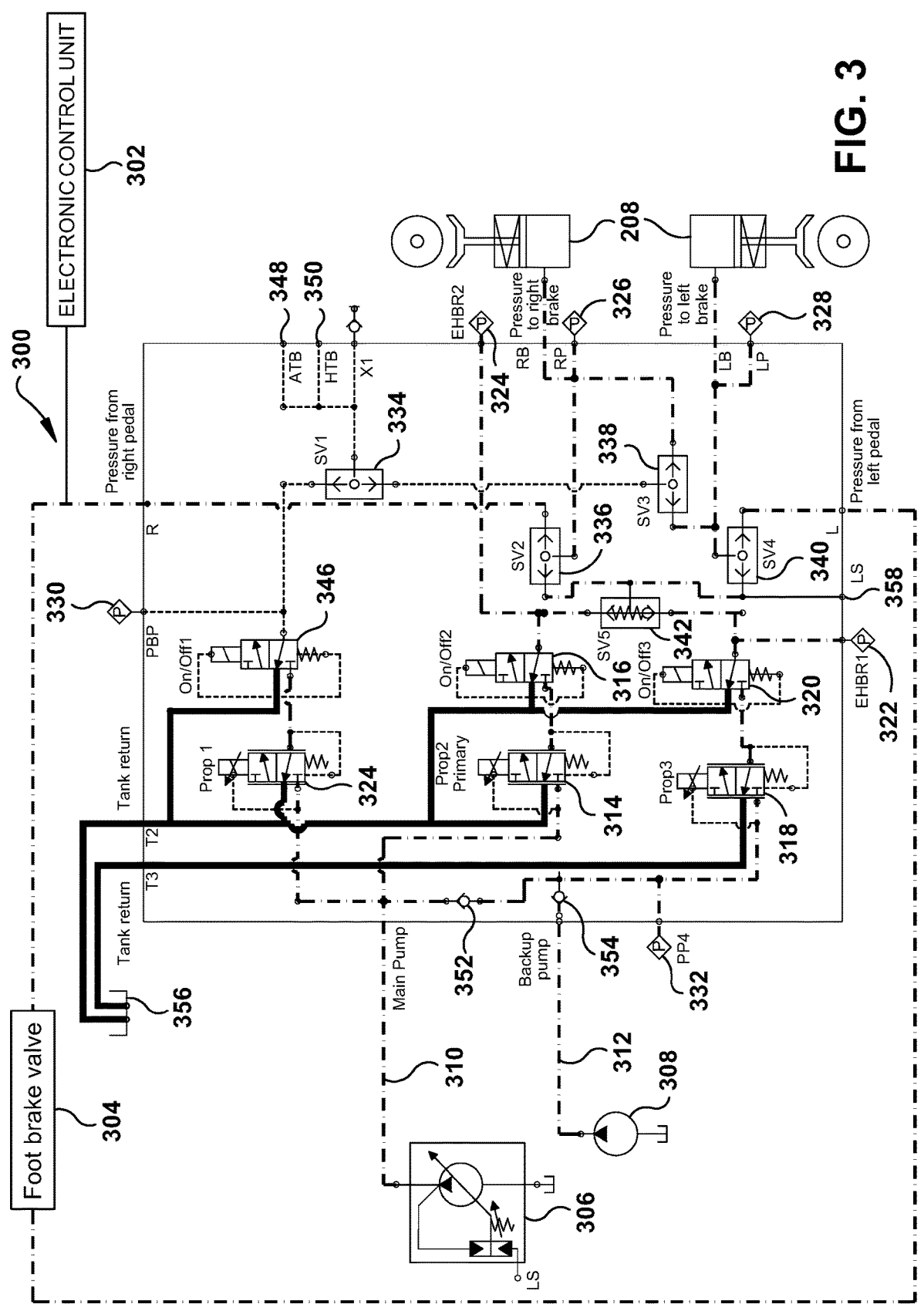
FIG. 3 is a schematic diagram illustrating a brake system according to one implementation.

In various examples, multiple power supplies (e.g., hydraulic power sources) and multiple valves are implemented to provide normal operation braking and failure operation braking. That is, backup and/or redundant control is provided in various examples that allows for switching from main braking components to backup braking components, such as in the event of a failure one or more of the main braking components. One example of a brake system 300 is shown in FIG. 3 and can include the brakes 208, illustrated as left and right brakes and operate or form part of the autonomous brake system 200. In other examples, the brakes 208 are front and rear brakes. It should be appreciated that the brakes 208 can be brakes of any type and configured in different ways. The brakes 208 are operated and/or controlled by one or more arrangements described herein, such as shown in FIG. 3. As can be seen, an electronic control unit (ECU) 302 is configured to control operation (e.g., actuation) of the brake system 300, such as one or more components of the brake system 300 as described in more detail herein. For example, the ECU 302 generates control signals that are transmitted to one or more components of the brake system 300 and, in response, the one or more components are actuated and/or controlled. It should be noted that the ECU 302 can be embodied as or included one or more components of the autonomous brake system 200 as illustrated in FIG. 2. The ECU 302 in various examples is connected to one or more control lines (e.g., electrical control lines) or one or more components, such as one or more valves as described in more detail herein.

As can be seen, the brake system 300 includes a primary power supply, configured as a main power supply that powers or is embodied as a main pump 306, and a secondary power supply, configured as a backup energy source 208, such as any type of backup power supply or source that provide backup power, such as a backup pump, a hydraulic accumulator, or other energy source. In this example, the main pump 306 is a piston pump and the backup energy source 308 is a gear pump. However, different types of energy sources and pumps can be used to operate as the main pump 306 and the backup energy source 308. The main pump 306 and the backup energy source 308 are configured to selectively supply power to generate a braking force applied by the brakes 208. That is, the main pump 306 and the backup energy source 308 operate to provide pump power via one or more valves to the brakes 208. Thus, one or more examples include a backup power source for the brakes, as well as backup valves (for redundancy) in the case of failure of one or more components as described in more detail herein.

For example, upon application of one or more brake pedals associated with a foot brake valve 304 or generation of one or more control signals by the ECU 302 that are transmitted to one or more components of the brake system 300, one or more valves are triggered such that fluid from a main hydraulic supply line 310 (via the main pump 306 or other pressure source) or fluid from a backup hydraulic supply line 312 (via the backup energy source 308 or other pressure source) is delivered to brake actuators. In turn, the brake actuators are controllably actuated to deliver hydraulic brake pressure to, for example, the tractor braking system that includes or forms part of the brakes 208 to control the speed of and/or stop the tractor. As will be described in more detail, the control arrangement of various examples provide redundant and/or backup braking in the event of a failure of the primary braking component(s), such as when a failure of the main supply or in certain failures of the energy transmission path occur. As such, in various examples, the brake system 300 is configured to provide switching between the foot brake valve 304 (integrated (communicatively coupled) into the system through shuttle valves 336, 340) and the autonomous operation as described in more detail herein.

In the illustrated example, the autonomous brake system 200 provides the backup functionality in part using a primary valve set that is configured having a control valve 314 (also referred to as a primary control valve) and an enable valve 316 (configured as a redundant valve to the primary valve 314), and a secondary valve set that is configured having a control valve 318 (also referred to as a secondary control valve) and an enable valve 320 (configured as a redundant valve to the secondary valve 318). The control valve 314 and the enable valve 316 operate as main valves during normal operation and the control valve 318 and the enable valve 320 operate as backup (or redundant) valves during backup or failure operation in some examples. That is, the two valve sets can be operated separately or simultaneously to control pressure applied to the brakes 208 during different conditions of the autonomous brake system 200. As such, in various examples, the control valve 314 and the enable valve 316 are configured as a primary control valve and a secondary control valve respectively, and the control valve 318 and the enable valve 320 are configured as a backup control valve and a backup enable valve, respectively.

More particularly, in some examples, the autonomous brake system 200 provides backup braking using the primary and secondary control valves 314, 318 that are electronically controlled proportional valves connected in parallel. In normal operation, the primary and secondary control valves 314, 318 can be applied simultaneously or individually. In the event of a failure, the non-failed components can be used to slow and/or stop the tractor (e.g. the backup energy source 308 or the operational electronic proportional valve, namely the secondary valve 318). Each of the primary and secondary control valves 314, 318 is paired with a second valve in series, namely the enable valves 316, 320. The additional enable valves 316, 320 in series further act as a redundant means, for example, to shut off the proportional valve circuit for diagnostics, when not in use, or in the event of a failed proportional valve (e.g., failure of one of the primary and secondary control valves 314, 318). In some examples, the output of the primary and secondary control valves 314, 318, which are electronically controlled proportional valves, is resolved with pressure commands provided by the operator, before being sent to the tractor foundation brakes (e.g., the brakes 208). This resolved signal provides a load sensing signal to a pump, for example, the main pump 306 or backup energy source 308 in some examples.

In various examples, one or more pressure sensors 322, 324, 326, 328, 330, 332 are configured to measure one or more of a primary energy source pressure, a backup energy source pressure, or a resolved brake pressure, as described more detail herein. The one or more pressure sensors 322, 324, 326, 328, 330, 332 can be any type of pressure sensor, and in some examples are pressure transducers. As should be appreciated, one or more of the pressure sensors 322, 324, 326, 328, 330 can be used between the control and enable valves in the electrohydraulic circuits.

In operation, the autonomous brake system 200 is operable to control the brakes 208 using the primary valve set, configured as a hydraulic valve set in some examples, or the secondary valve set, configured as a hydraulic valve set in some examples. As described herein, each of the valve sets include both a proportional solenoid valve as the primary and secondary control valves 314, 318 and a shutoff valve as the enable valves 316, 320. In various examples, ECU 302 is in electrical communication with the hydraulic valve sets to control operation thereof. For example, one or more brake commands can be communicated from the ECU 302 to the first or secondary valve sets. Moreover, the valve sets are also configured to send signals to the ECU 302 in response to operation thereof (e.g., one or more of the one or more of the sensors 322, 324, 326, 328, 330, 332 communicate a pressure associated with one or more of the valve sets to the ECU 302).

In the illustrated example, one or more shuttle valves 334, 336, 338, 340, 342 are fluidly coupled within the flow paths of the autonomous brake system 200. That is, one or more of the shuttle valves 334, 336, 338, 340, 342 are fluidly coupled between the primary and secondary valve sets and the fluid output, where the shuttle valves 334, 336, 338, 340, 342 are movable in response to a difference between a first pressure in a first flow path and a second pressure in a second flow path as described in more detail herein.

For example, the shuttle valve 342 is disposed in fluid communication with the primary valve set and the secondary valve set, namely at the outputs of the enable valves 316, 320. The shuttle valve 342 is configured to be actuated in either direction depending upon which pressure from the enable valves 316, 320 is the greatest. As such, the greater of the two pressures passes through the shuttle valve 342 as a brake pressure, thereby defining primary and backup brake pressure in various examples. That is, primary pressure applied during normal operation is generated by the main pump 306 using the primary valve set (the primary control valve 314 and the enable valve 316) and backup pressure applied during, for example, failure operation is generated by the backup energy source 308 using the secondary valve set (the secondary control valve 318 and the enable valve 320).

In operation, outlet pressure from the primary and the secondary valve set may flow through fluid lines, with the hydraulic valve set fluid lines converging upon the shuttle valve 342. Similar to the operation described above, the greater of the brake pressures passes through the shuttle valve 342 (which in this example is spring biased) and enters hydraulic lines that causes hydraulic pressure to be applied to the brakes 208 through the shuttle valves 336, 340. For example, in the event of normal operation or in the event of braking failure, based on a detected pressure at sensors 322, 324, the main pump 306 or the backup energy source 308, respectively, acts as the power source (e.g., hydraulic pressure source) that is selectively actuated to apply normal braking operation pressure or backup braking pressure (which may be the same amount of pressure or a different amount of pressure) to the brakes 208 through the shuttle valves 336 and 340. It should be noted that the primary control valve 314 and secondary control valve 318 provide primary and backup braking functionality, and the enable valve 314 and the enable valve 316 provide redundant backup to the primary control valve 314 and secondary control valve 318, respectively. It should be noted that the sensor 322 is a pressure sensor associated with the primary valve set and the sensor 324 is the pressure sensor associated with the secondary valve set.

Further, and continuing with this example, the shuttle valves 336, 340 are disposed in fluid communication with a brake actuator of one of the brakes 208 and a brake actuator of the other one of the brakes 208. The shuttle valves 336, 340 are configured to be actuated in either direction depending upon which brake pressure is the greatest. As such, the greater of the two brake pressures passes through the shuttle valves 336, 340 as a brake pressure. That is, the shuttle valves 336, 340 are configured to apply primary or backup pressure to one or more of the brakes 208. As should be appreciated, the brake pressure flows downstream from the shuttle valves 336, 340 along one or more fluid lines (e.g., hydraulic lines) in various examples. As such, the primary and secondary control valves 314, 318 modulate pressure electronically under different conditions, namely under normal or failure braking conditions.

Figure 10:
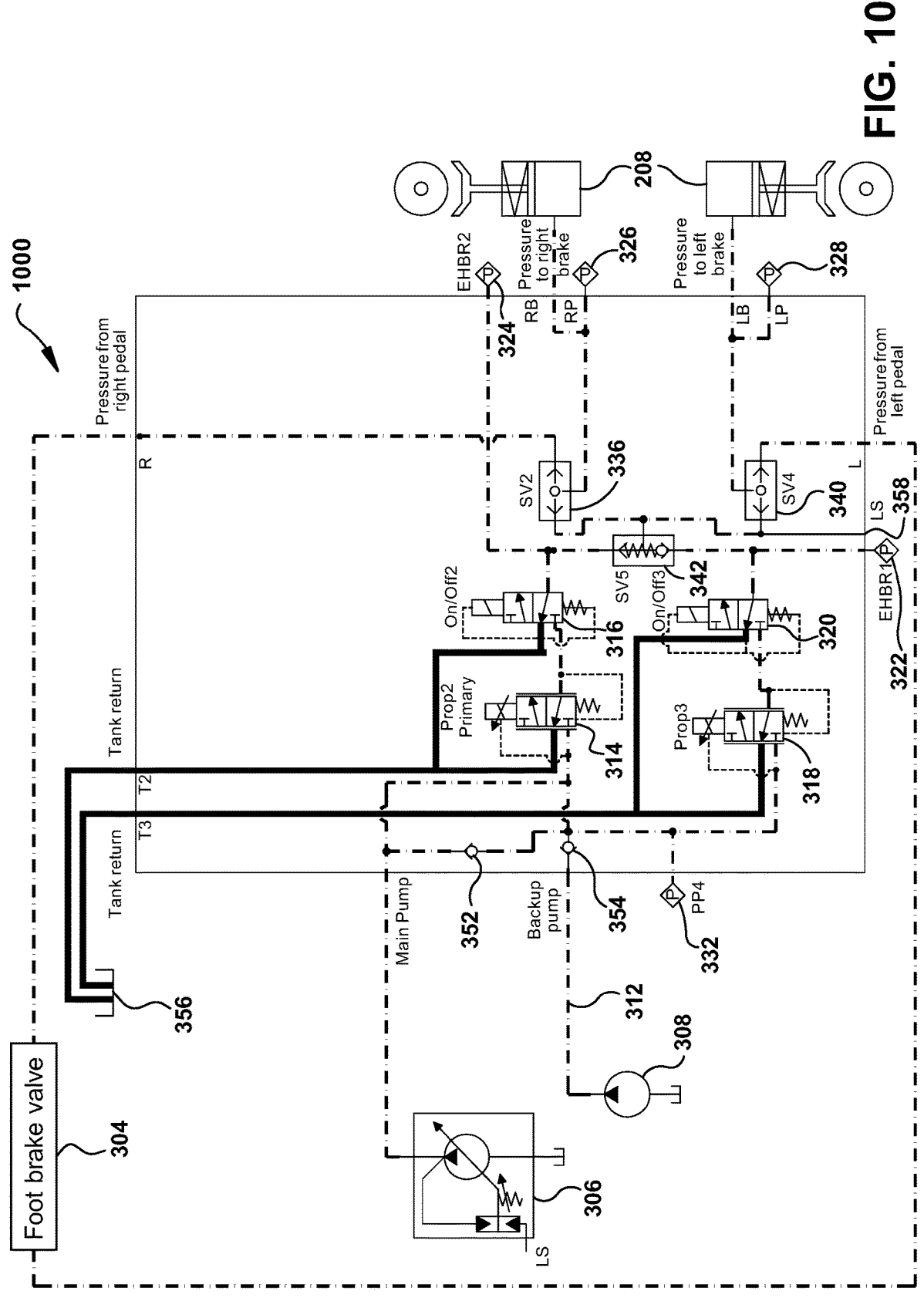
FIG. 10 is a schematic diagram illustrating a brake system according to another implementation.
Figure 11:
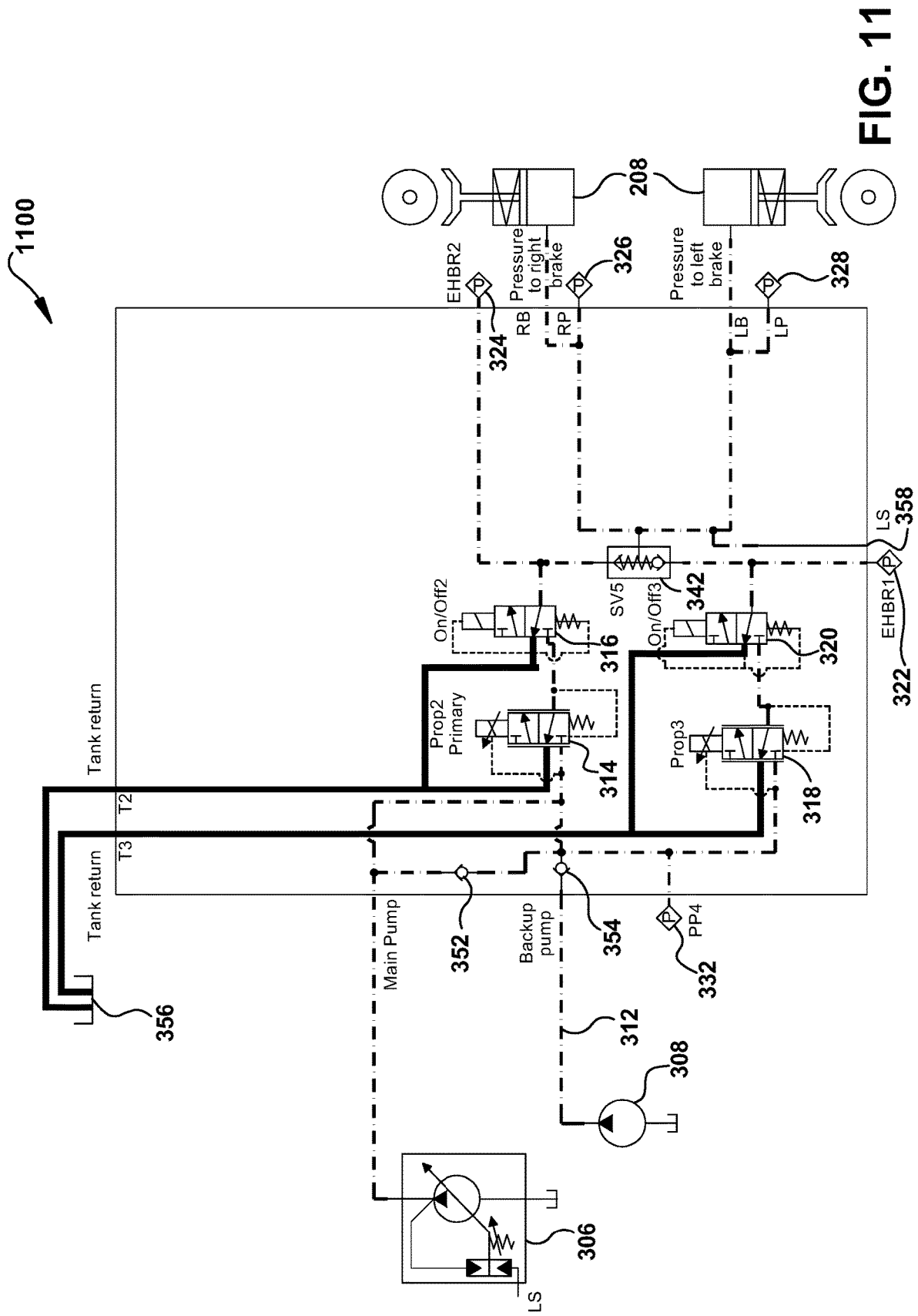
FIG. 11 is a schematic diagram illustrating a brake system according to another implementation.

It should be noted that the autonomous brake system 200 can include additional or optional braking control, such as a trailer brake control that includes a third valve set configured having a control valve 344 and an enable valve 346. This additional or optional control arrangement is configured, for example, as a hydraulic trailer brake circuit in some examples. That is, the hydraulic trailer brake circuit operates in a similar modulated pressure control arrangement having redundancy provided by the control valve 344 and the enable valve 346 to provide braking operation for a trailer in some examples. In operation, the shuttle valve 334 is disposed in fluid communication with the third valve set. The shuttle valve 334 is configured to be actuated in either direction depending upon which pressure, in this example, from the left or right brakes 208 is the greatest and sent to a trailer brake (not shown) for a trailer (or other implement) being towed by the vehicle 100. That is, the greater of the two brake pressures passes through the shuttle valve 334 to perform braking for the trailer in some examples. Thus, the autonomous brake system 200 in some examples includes a trailer brake circuit and in other examples does not include the trailer brake circuit (see brake systems 1000 and 1100 illustrated in FIGS. 10 and 11).

The autonomous brake system 200 includes additional components in various examples, such as check valves 352, 354 that prevent backflow between the main pump 306 and the backup energy source 308. Additionally, a tank return 356 is provided wherein pressure is brought back to the tank return 356 when the brakes 208 are released.

Figure 4:
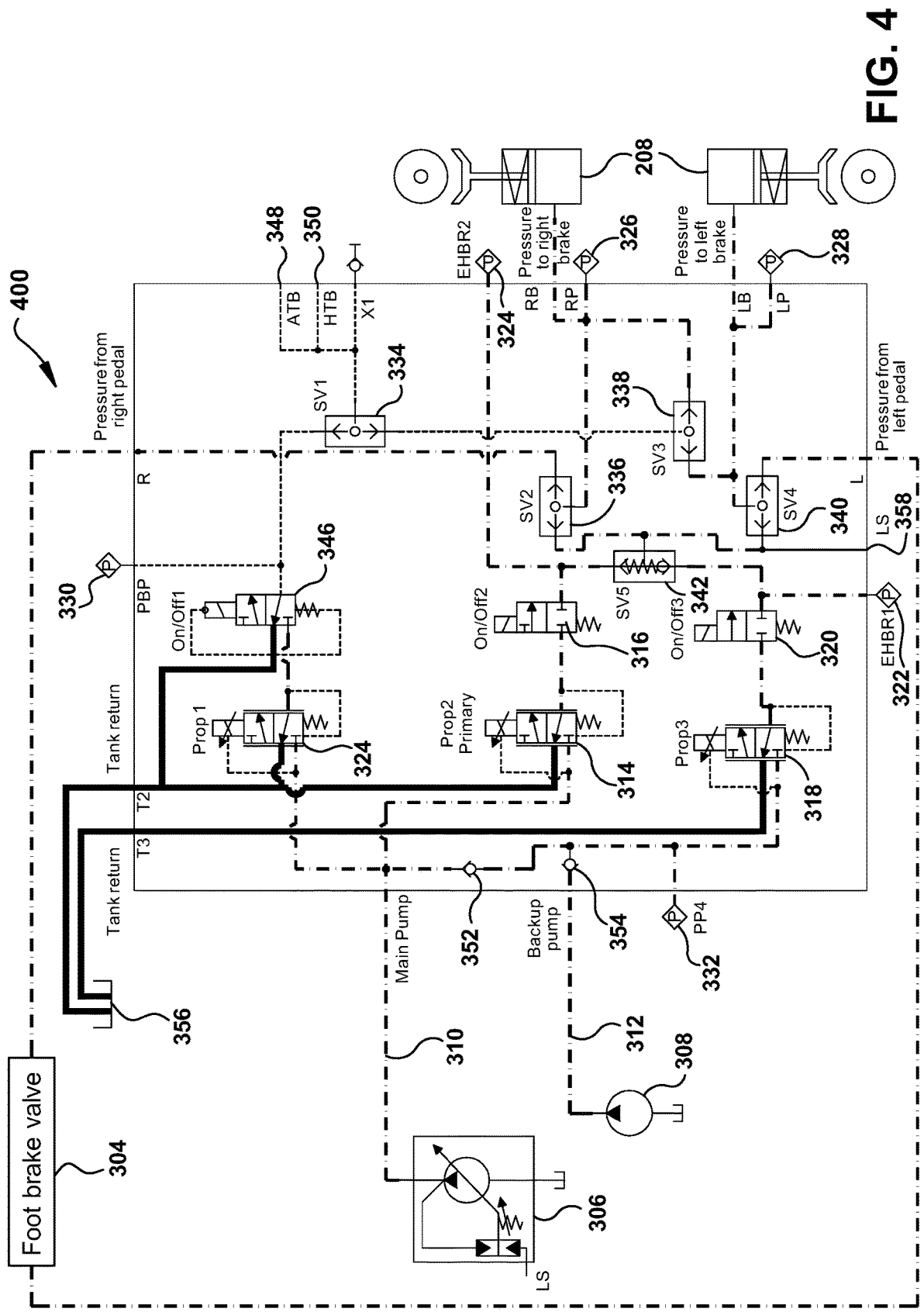
FIG. 4 is a schematic diagram illustrating a brake system according to another implementation.
Figure 5:
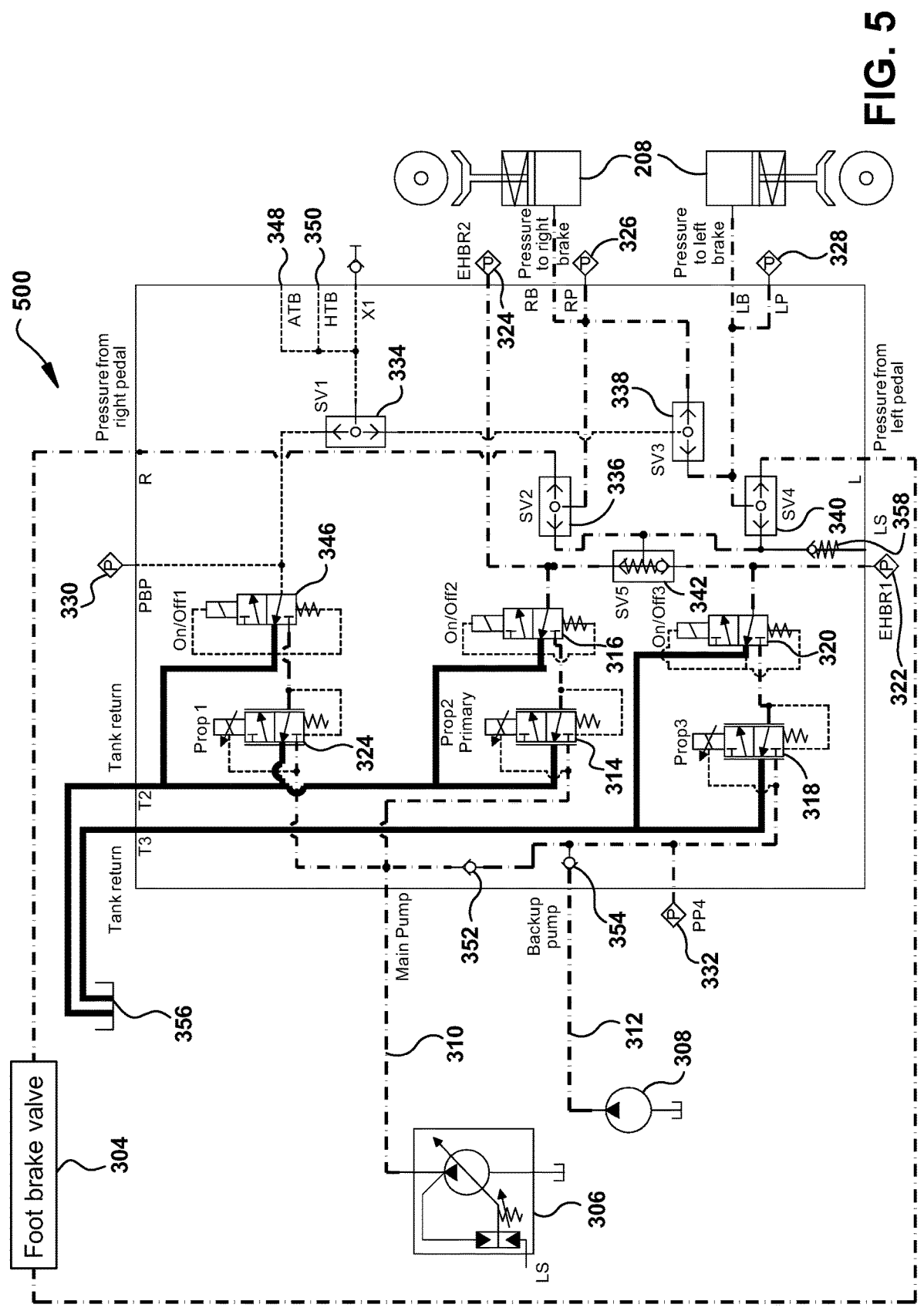
FIG. 5 is a schematic diagram illustrating a brake system according to another implementation.
Figure 6:
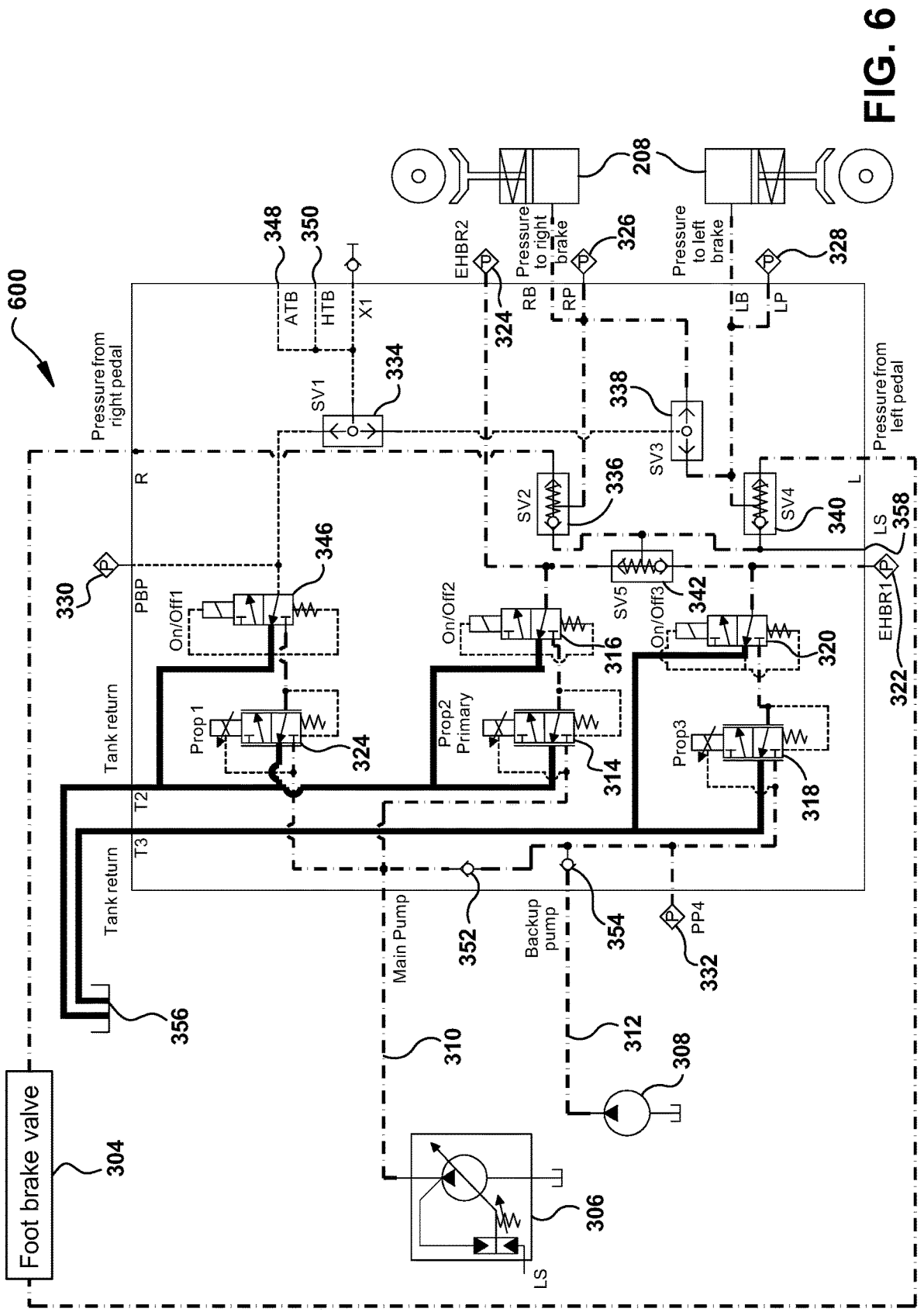
FIG. 6 is a schematic diagram illustrating a brake system according to another implementation.

Variations and modifications to the autonomous brake system 200 are contemplated. For example, the enable valves 316, 320 and the shuttle valve 342, can be any type of valves. That is, while these valves are illustrated as three-way shutoff valves, one or more of these valves can be two-way enable valves (see brake system 400 illustrated in FIG. 4). As another example, while the shuttle valve 336, 340 are illustrated as spring bias shuttle valves, these valves can be other types of shuttle valves, such as non-spring bias shuttle valves (see brake system 600 illustrated in FIG. 6). Additionally, an LS 358 can be dynamic (see brake system 500 illustrated in FIG. 5) or static.

Figure 7:
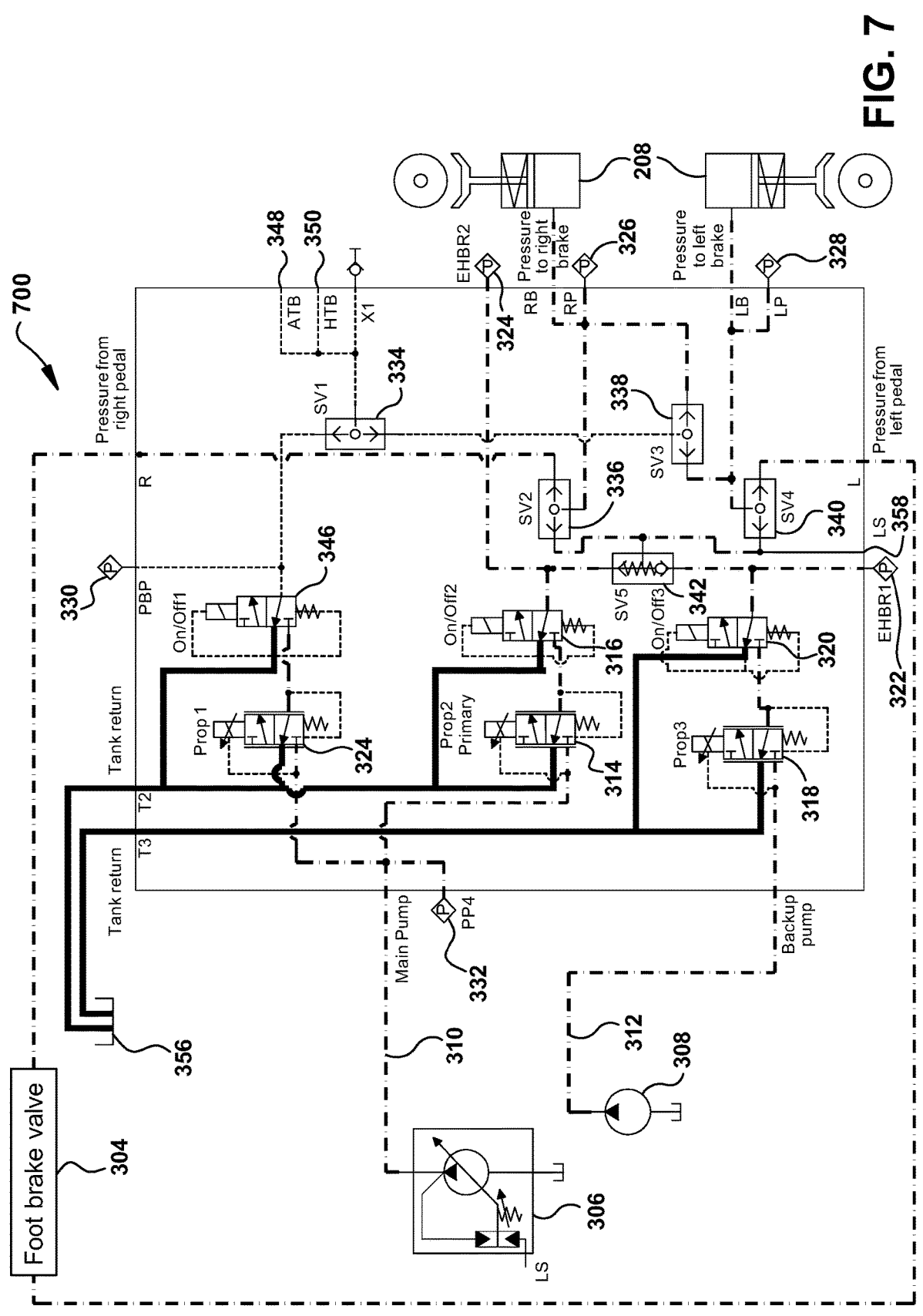
FIG. 7 is a schematic diagram illustrating a brake system according to another implementation.
Figure 8:
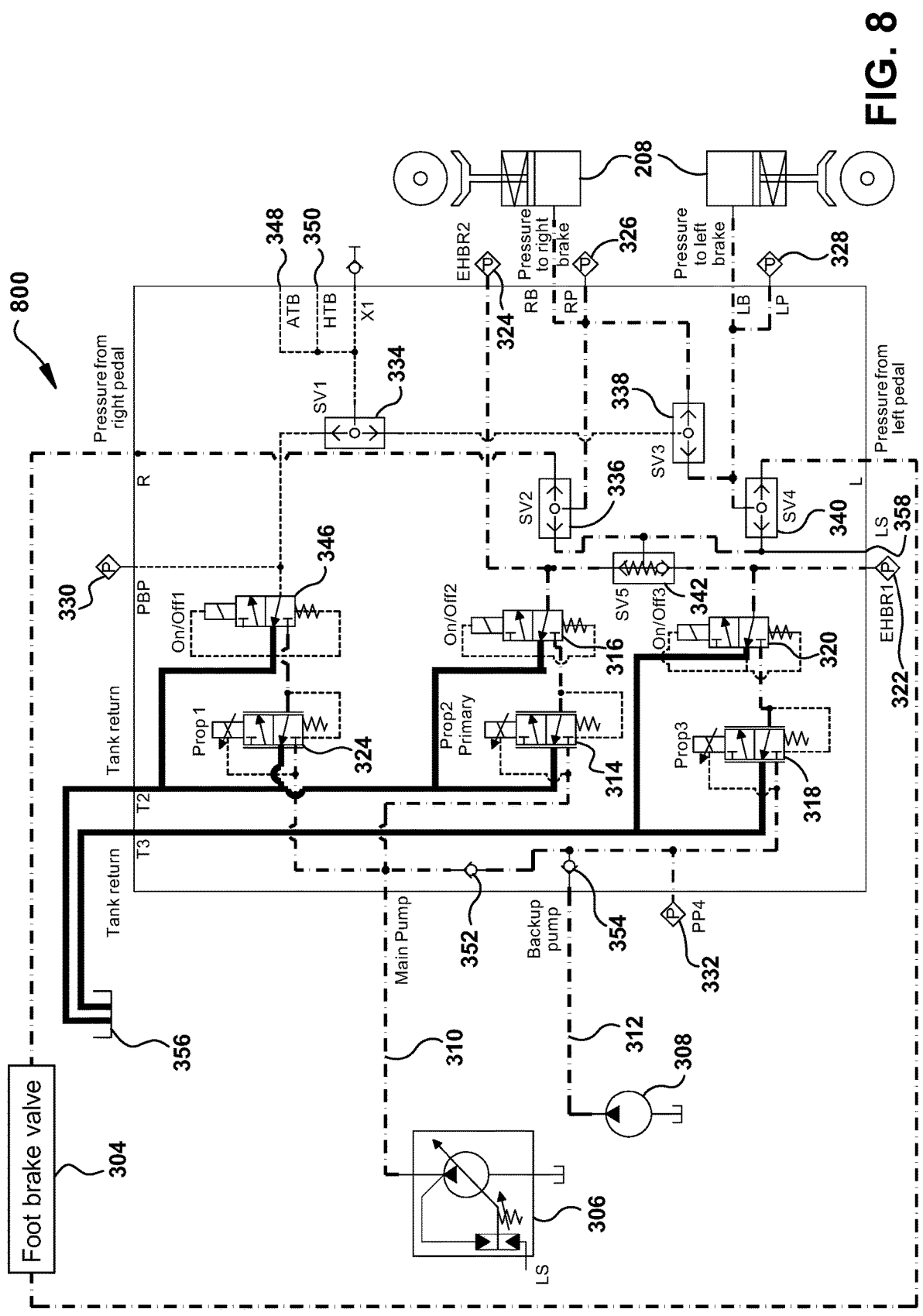
FIG. 8 is a schematic diagram illustrating a brake system according to another implementation.
Figure 9:
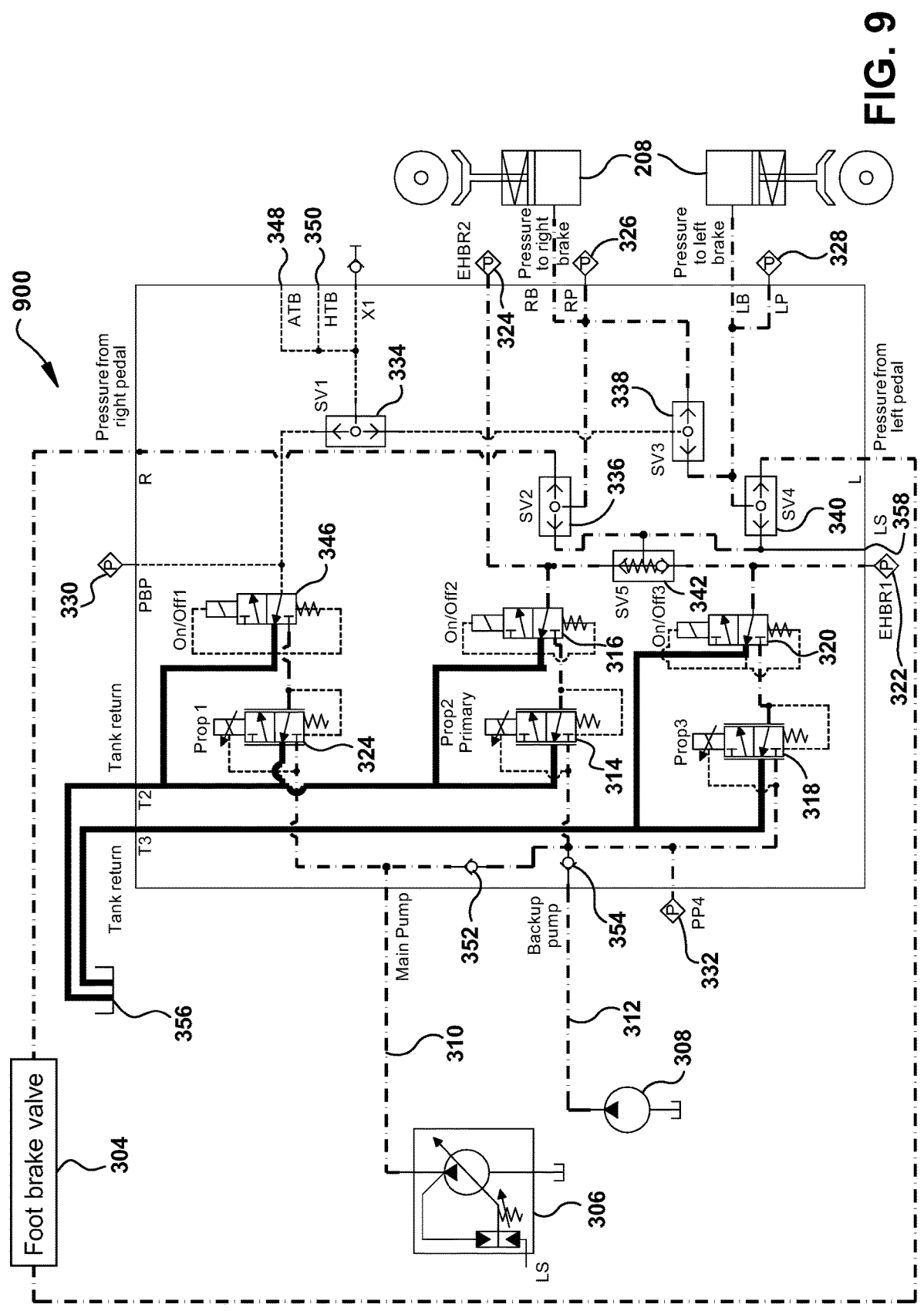
FIG. 9 is a schematic diagram illustrating a brake system according to another implementation.

The autonomous brake system 200 can also be provided in different operational configurations. That is, the conditions under which the main pump 306 supplies power and the conditions under which the backup energy source 308 supplies power can be varied. For example, the main pump 306 and the backup energy source 308 (illustrated as a backup pump) can operate under different conditions or to resolve different failures, such as shown in Table 1 below, wherein Prop 2 refers to the primary valve 314 and Prop 3 refers to the secondary valve 318 (see brake systems 700, 800, 900 illustrated in FIGS. 7-9).

TABLE 1

| Main pump supplies | Backup pump supplies |
| --- | --- |
| Prop 2 | Prop 3 |
| Prop 2 and Prop 3 | Prop 3 |
| Prop 2 and prop 3 | Prop 2 and prop 3 |

As other examples of variations and modifications, the autonomous brake system 200 can be configured with both proportional circuits in a common manifold or in separate manifolds. For example, the proportional circuits can be packaged in a way that also provides a trailer brake pilot.

Thus, one or more examples provide a means to actuate brakes, for example, the tractor brakes, autonomously, and in the event of a single point failure, provides a backup means to actuate the brakes. In addition, one or more examples retain the ability for the operator to actuate the brakes from the vehicle cab.

Figure 12:
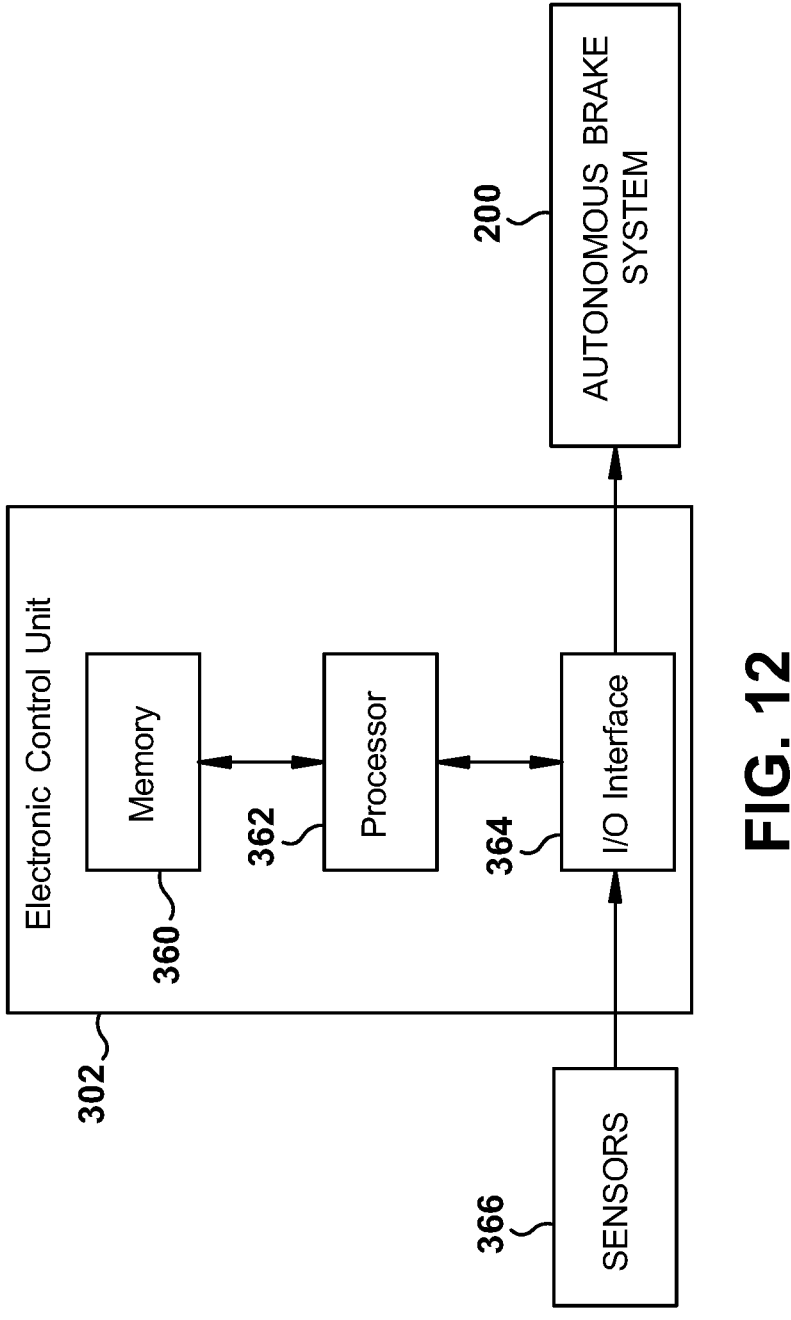
FIG. 12 is a block diagram of an electronic control unit usable with one or more implementations.

In the illustrated example, the ECU 302 is configured to control various aspects of the operation of the autonomous brake system 200, such as the actuation of the various valves. FIG. 12 illustrates an example of the ECU 302 for controlling the autonomous brake system 200. The ECU 302 includes a plurality of electrical and electronic components that provide power, operational control, and protection to the components and modules within the ECU 302. In particular, the ECU 302 includes, among other things, an electronic processor 362 (e.g., a programmable microprocessor, microcontroller, or similar device), non-transitory, machine-readable memory 360, and an input/output interface 364. The electronic processor 362 is communicatively coupled to the memory 360. The electronic processor 362 is configured to retrieve from the memory 360 and execute, among other things, instructions related to the control processes and methods described herein, such as to control braking by the autonomous brake system 200. In some examples, the ECU 302 includes additional, fewer, or different components. The ECU 302 may also be configured to communicate with external systems including, for example, other components of the vehicle 100 and/or operator controls.

The ECU 302 in the illustrated example is communicatively coupled to a plurality of sensors 366, which may be embodied as or include one or more of the sensors 322, 324, 326, 328, 330, 332 (see FIG. 3). The ECU 302 in some examples receives a signal input from one or more of the sensors 366 indicative of, for example, a pressure level and is configured to adjust and/or control one or more components (e.g., one or more valves) of the autonomous brake system 200. The input/output interface 364 facilitates communication between the ECU 302 and the autonomous brake system 200. Through the input/output interface 364, the ECU 302 is configured, for example, to control different settings of the autonomous brake system 200 to obtain a desired or required braking.

It should be noted that the memory 360 in some examples includes any computer-readable media. In one example, the memory 360 is used to store and access instructions configured to carry out the various operations disclosed herein. In some examples, the memory 360 includes computer storage media in the form of volatile and/or nonvolatile memory, removable or non-removable memory, data disks in virtual environments, or a combination thereof. In one example, the processor(s) 362 includes any quantity of processing units that read data from various entities, such as the memory 360. Specifically, the processor(s) 362 are programmed to execute computer-executable instructions for implementing aspects of the disclosure. In one example, the instructions are performed by the processor(s) 362 and the processor 362 is programmed to execute instructions such as those to perform one or more operations discussed herein and depicted in the accompanying drawings.

It should also be noted that computer readable media comprises computer storage media and communication media. Computer storage media include volatile and non-volatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A brake system, comprising:

at least one brake;

a main pump;

a backup energy source;

a primary valve set having a primary control valve in series with a primary enable valve;

a secondary valve set having a secondary control valve in series with a secondary enable valve;

a first shuttle valve in fluid communication with the primary valve set, the secondary valve set, and the at least one brake, wherein the first shuttle valve is positioned between the at least one brake and the primary valve set and the secondary valve set, wherein the at least one brake, the main pump, the backup energy source, the primary valve set, and the secondary valve set are in fluid communication; and a control unit configured to control operation of the main pump, the backup energy source, the primary valve set, and the secondary valve set in response to one of a normal braking condition or a failure braking condition.

2. The brake system of claim 1, further comprising one or more sensors communicatively coupled with one or more of the main pump, the backup energy source, the primary valve set, and the secondary valve set, wherein the control unit is configured to control operation of the main pump, the backup energy source, the primary valve set, and the secondary valve set in response to one or more sensed conditions from the one or more sensors.

3. The brake system of claim 1, wherein the main pump comprises a piston pump and the backup energy source comprises a gear pump.

4. The brake system of claim 1, wherein the primary control valve and the secondary control valve each comprise an electronically controlled proportional valve.

5. The brake system of claim 1, wherein the primary enable valve and the secondary enable valve each comprise one of a two-way on/off valve or a three-way on/off valve.

6. The brake system of claim 1, further comprising one or more further shuttle valves in fluid communication with one or more of the at least one brake, the main pump, the backup energy source, the primary valve set, and the secondary valve set.

7. The brake system of claim 6, wherein the one or more further shuttle valves comprise one of a non-bias shuttle valve and a spring bias axle shuttle valve.

8. The brake system of claim 1, further comprising a third valve set having a control valve and an enable valve, wherein the third valve set is configured as a trailer brake circuit.

9. The brake system of claim 1, further comprising a foot brake valve communicatively coupled to a pair of shuttle valves, wherein the control unit is configured to control semi-autonomous braking operation using the main pump, the backup energy source, the primary valve set, the secondary valve set, and the pair of shuttle valves.

10. A method for autonomous braking, the method comprising:

determining an operating condition of at least one brake of a vehicle to be in a normal braking condition or a failure braking condition;

controlling a primary valve set having a primary control valve in series with a primary enable valve to apply braking force to the at least one brake in response to a determination of the normal braking condition;

controlling a secondary valve set having a secondary control valve in series with a secondary enable valve to apply braking force to the at least one brake in response to a determination of the failure braking condition; and controlling application of braking force to the at least one brake via the primary valve set or secondary valve set with a first shuttle valve positioned between the at least one brake and the primary valve set and the secondary valve set.

11. The method of claim 10, further comprising using one of a main pump or a backup energy source to generate the applied braking force.

12. The method of claim 11, wherein the main pump comprises a piston pump and the backup energy source comprises a gear pump.

13. The method of claim 10, wherein the primary control valve and the secondary control valve each comprise an electronically controlled proportional valve.

14. The method of claim 10, wherein the primary enable valve and the secondary enable valve each comprise one of a two-way on/off valve or a three-way on/off valve.

15. The method of claim 11, further comprising controlling application of braking force using one or more additional shuttle valves in fluid communication with one or more of the at least one brake, the main pump, the backup energy source, the primary valve set, the secondary valve set, and the first shuttle valve.

16. The method of claim 14, wherein the one or more additional shuttle values comprise one of a non-bias shuttle valve and a spring bias axle shuttle valve.

17. A vehicle for ground working operation in a field, the vehicle comprising:

a plurality of wheels;

a chassis supported on the plurality of wheels and configured for moveable operation, the chassis configured with attachment points for movable coupling to a work tool; and a brake system configured to apply brakes to one of slow or stop rotation of the plurality of wheels, the brake system comprising:

at least one brake;

a main pump;

a backup energy source;

a primary valve set having a primary control valve in series with a primary enable valve;

a secondary valve set having a secondary control valve in series with a secondary enable valve;

a first shuttle valve in fluid communication with the primary valve set, the secondary valve set, and the at least one brake, wherein the first shuttle valve is positioned between the at least one brake and the primary valve set and the secondary valve set, wherein the at least one brake, the main pump, the backup energy source, the primary valve set, and the secondary valve set are in fluid communication; and a control unit configured to control operation of the main pump, the backup energy source, the primary valve set, and the secondary valve set in response to one of a normal braking condition or a failure braking condition.

18. The vehicle of claim 17, wherein the brake system further comprises one or more sensors communicatively coupled with one or more of the main pump, the backup energy source, the primary valve set, and the secondary valve set, wherein the control unit is configured to control operation of the main pump, the backup energy source, the primary valve set, and the secondary valve set in response to one or more sensed conditions from the one or more sensors.

19. The vehicle of claim 17, wherein the primary control valve and the secondary control valve each comprise an electronically controlled proportional valve, and the primary enable valve and the secondary enable valve each comprise one of a two-way on/off valve or a three-way on/off valve.

20. The vehicle of claim 17, wherein the brake system further comprises a foot brake valve communicatively coupled to a pair of shuttle valves, and the control unit is configured to control semi-autonomous braking operation using the main pump, the backup energy source, the primary valve set, the secondary valve set, and the pair of shuttle valves.

* * * * *